(12) United States Patent
Zhao

(10) Patent No.: US 12,604,318 B2
(45) Date of Patent: Apr. 14, 2026

(54) METHOD AND APPARATUS FOR DETERMINING FREQUENCY DOMAIN RESOURCE

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 1073 days.

(21) Appl. No.: 17/628,840

(22) PCT Filed: Jul. 23, 2019

(86) PCT No.: PCT/CN2019/097245
§ 371 (c)(1),
(2) Date: Jan. 20, 2022

(87) PCT Pub. No.: WO2021/012175
PCT Pub. Date: Jan. 28, 2021

(65) Prior Publication Data
US 2022/0272737 A1 Aug. 25, 2022

(51) Int. Cl.
*H04W 72/20* (2023.01)
*H04L 5/00* (2006.01)
*H04W 52/02* (2009.01)

(52) U.S. Cl.
CPC .......... *H04W 72/20* (2023.01); *H04L 5/0092* (2013.01); *H04W 52/0212* (2013.01)

(58) Field of Classification Search
CPC . H04W 72/20; H04W 52/0212; H04W 72/51; H04W 72/0453; H04W 4/40; H04L 5/0092; H04L 5/001; H04L 5/0044; Y02D 30/70
See application file for complete search history.

(56) References Cited

U.S. PATENT DOCUMENTS

| | | | |
|---|---|---|---|
| 2017/0050702 A1 | 2/2017 | Grassi et al. | |
| 2017/0215119 A1 | 7/2017 | Hong et al. | |
| 2017/0273077 A1 | 9/2017 | Kim et al. | |
| 2018/0309539 A1* | 10/2018 | Tang ..................... | H04L 5/0053 |
| 2019/0132830 A1* | 5/2019 | Tabet ................... | H04W 72/21 |

(Continued)

FOREIGN PATENT DOCUMENTS

| | | |
|---|---|---|
| CN | 108024230 A | 5/2018 |
| CN | 109548173 A | 3/2019 |
| CN | 109565490 A | 4/2019 |

(Continued)

OTHER PUBLICATIONS

Huawei et al., "On bandwidth part and bandwidth adaptation", 3GPP TSG RAN WG1 Meeting *89, R1-1706900, Hangzhou, China, May 15-19, 2017, (9p).

(Continued)

*Primary Examiner* — Fred A Casca
(74) *Attorney, Agent, or Firm* — Arch & Lake LLP

(57) ABSTRACT

A method for determining a frequency domain resource, including: determining, by a first type of sidelink device, a target device type of a receiving end device for sidelink communication; and determining a target frequency domain resource for sidelink communication with the receiving end device according to the target device type.

12 Claims, 6 Drawing Sheets

(56)             References Cited

U.S. PATENT DOCUMENTS

2019/0306923 A1*   10/2019   Xiong .................. H04L 27/261
2022/0369417 A1*   11/2022   Park ................. H04W 52/0258

FOREIGN PATENT DOCUMENTS

CN        109586881 A     4/2019
WO       2018028417 A1    2/2018

OTHER PUBLICATIONS

ZTE, "Resource allocation for wideband operation", 3GPP TSG RAN WG1 Meeting #90, R1-1712669, Prague, Czech Republic, Aug. 21-25, 2017, (7p).
International Search Report of PCT Application No. PCT/CN2019/097245 dated Apr. 26, 2020 with English translation, (6p).
ASUSTEK, "Further Discussion on the Reset of BFD Counting", 3GPP TSG-RAN WG2 Meeting AH-1807, R2-1809568, Montreal, Canada, Jul. 6, 2018, (5p ).
LG Electronics, "Discussion on Physical Layer Structure for NR V2X", 3GPP TSG RAN WG1 Meeting #95, R1-1813860, Spokane, WA, Nov. 16, 2018, (8p).
Supplementary Search Report accompanying Notification to Grant Patent issued to Chinese Application No. 20198000483.8 dated Aug. 18, 2022 with English translation (4p).

* cited by examiner

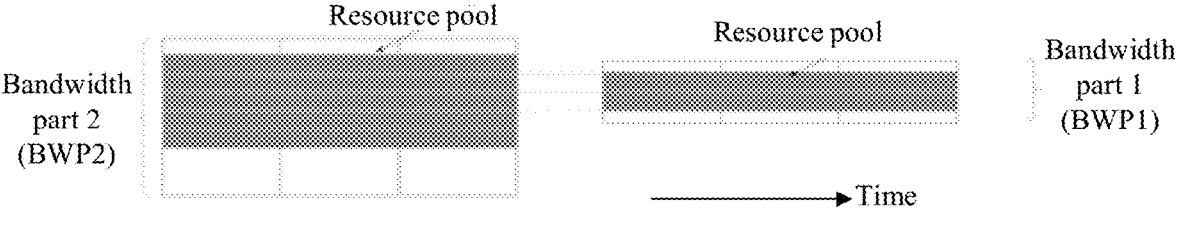
Fig. 1
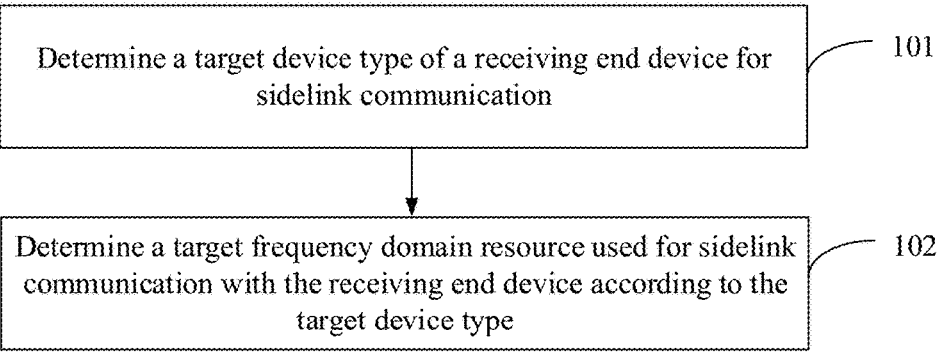
Fig. 2
Determine a target device type of a receiving end device for sidelink communication    101
Determine a target frequency domain resource used for sidelink communication with the receiving end device according to the target device type    102
Fig. 3

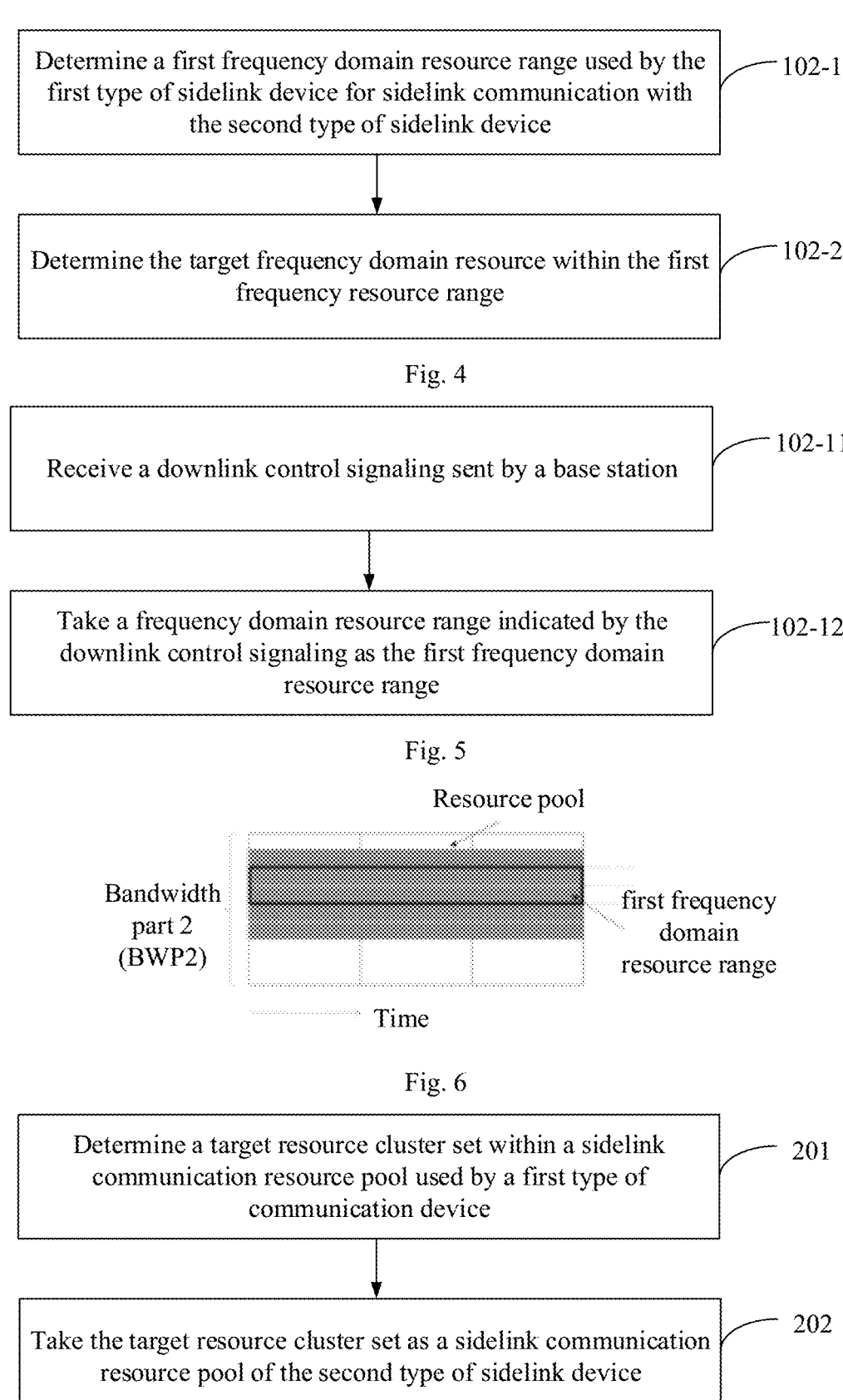

Determine a first frequency domain resource range used by the first type of sidelink device for sidelink communication with the second type of sidelink device — 102-1

Determine the target frequency domain resource within the first frequency resource range — 102-2

Fig. 4

Receive a downlink control signaling sent by a base station — 102-11

Take a frequency domain resource range indicated by the downlink control signaling as the first frequency domain resource range — 102-12

Fig. 5

Resource pool

Bandwidth part 2 (BWP2)

first frequency domain resource range

Time

Fig. 6

Determine a target resource cluster set within a sidelink communication resource pool used by a first type of communication device — 201

Take the target resource cluster set as a sidelink communication resource pool of the second type of sidelink device — 202

Fig. 7

METHOD AND APPARATUS FOR DETERMINING FREQUENCY DOMAIN RESOURCE

CROSS-REFERENCE TO RELATED APPLICATION

The present application is a U.S. National Phase of International Patent Application Serial No. PCT/CN2019/097245 filed on Jul. 23, 2019. The entire content of the above-cited application is hereby incorporated by reference in its entirety for all purposes.

TECHNICAL FIELD

The present disclosure relates to the field of communication, in particular to a method and an apparatus for determining a frequency domain resource.

BACKGROUND

A Band Width Part (BWP) is introduced into an uplink and downlink design of a new radio (NR) system, and refers to a continuous frequency domain resource block (RB) at a given carrier frequency and at a given subcarrier interval. In NR uplink and downlink communication, the BWP is configured for each device, and is divided into a transmitting BWP and a receiving BWP. Each device can be equipped with a plurality of transmitting BWPs and receiving BWPs at one carrier frequency, but only one BWP can be activated at the same time, and dynamic or semi-static BWP switching can be performed according to downlink signaling of a base station. The device merely needs to monitor downlink control signaling in the activated BWP, and can only perform uplink transmission in the activated BWP.

SUMMARY

Examples of the present disclosure provide a method and an apparatus for determining a frequency domain resource. According to a first aspect of the example of the present disclosure, a method for determining a frequency domain resource is provided. The method is performed by a first type of sidelink device, and includes: determining a target device type of a receiving device for sidelink communication; and determining a target frequency domain resource for sidelink communication with the receiving device according to the target device type.

According to a second aspect of the example of the present disclosure, a method for determining a frequency domain resource is provided. The method is applied to a second type of sidelink device, and includes: determining a target resource cluster set within a sidelink communication resource pool adopted by a first type of sidelink device, where the target resource cluster set is located in a frequency domain resource range of a bandwidth part (BWP) adopted by the second type of sidelink device; and take the target resource cluster set as a sidelink communication resource pool of the second type of sidelink device; where the second type of sidelink device is the first type of sidelink device in an energy-saving state.

According to a third aspect of the example of the present disclosure, an apparatus for determining a frequency domain resource is provided. The apparatus is applied to a first type of sidelink device, and includes: a processor, a memory configured to store an executable instruction executed by the processor; where the processor is configured to: determine a target device type of a receiving device for sidelink communication; and determine a target frequency domain resource for sidelink communication with the receiving device according to the target device type.

It should be understood that the above general description and the following detailed description are merely example and explanatory, and cannot limit the present disclosure.

BRIEF DESCRIPTION OF THE DRAWINGS

Accompanying drawings described herein are incorporated in the specification and constitute a portion of the specification, and examples consistent with the present invention are described, and are used to explain principles of the present invention together with the specification.

FIG. 1 is a schematic diagram showing configuration of a frequency domain resource according to an example;

FIG. 2 is a schematic diagram of a resource cluster according to an example;

FIG. 3 is a schematic flowchart of a method for determining a frequency domain resource according to an example;

FIG. 4 is a schematic flowchart of another method for determining a frequency domain resource according to an example;

FIG. 5 is a schematic flowchart of another method for determining a frequency domain resource according to an example;

FIG. 6 is a schematic diagram of a scene of determining a frequency domain resource according to an example;

FIG. 7 is a schematic flowchart of another method for determining a frequency domain resource according to an example;

DETAILED DESCRIPTION

Figure 8:
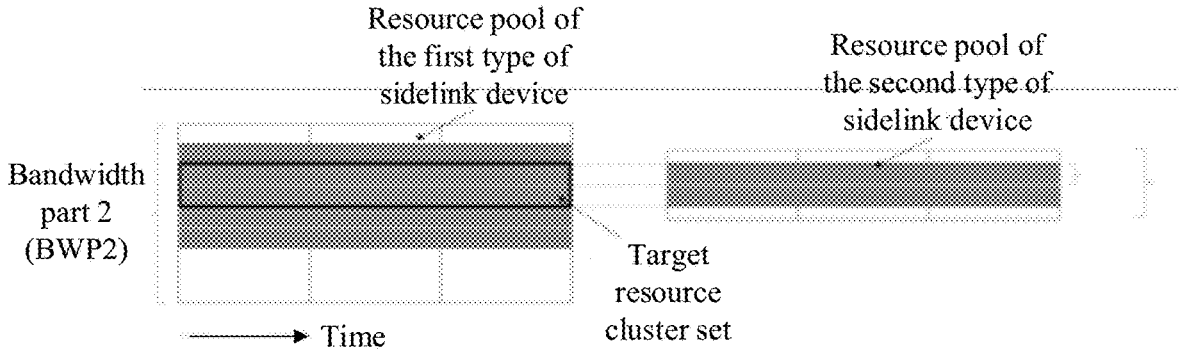
FIG. 8 is a schematic diagram of another scene of determining a frequency domain resource according to an example.

Examples will be described in detail herein, with examples shown in the accompanying drawings. When the following description involves the accompanying drawings, unless otherwise indicated, the same numbers in different accompanying drawings indicate the same or similar elements. Implementation manners described in the following examples do not represent all implementation manners consistent with the present invention. On the contrary, they are merely examples of an apparatus and a method consistent with some aspects of the present invention as detailed in the appended claims.

Terms used in the present disclosure are merely for the purpose of describing specific examples rather than limiting the present disclosure. The singular forms of "a/an," "said," and "the" used in the present disclosure and the appended claims are also intended to include the plural forms, unless clearly indicated otherwise in the context. It should also be understood that the term "and/or" as used herein refers to and includes any or all possible combinations of one or more associated listed items.

It should be understood that although the terms first, second, third, etc. may be used in the present disclosure to describe various kinds of information, the information should not be limited to these terms. These terms are merely used to distinguish the same type of information from each other. For example, without departing from the scope of the present disclosure, first information may also be called second information, and similarly, the second information may also be called the first information. The word "if" as used herein may be interpreted as "when" or "while" or "in response to determining that" as the context changes.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components that are directly or indirectly linked together, so as to perform a particular function.

The vehicle-to-everything (V2x) technology discussed in NR version 16 (Rel-16) mainly focuses on vehicle-to-vehicle communication and service. Due to the existence of a vehicle-mounted battery, it is unnecessary to consider the energy-saving problem of a vehicle-mounted terminal. In NR V2x Rel16, a sidelink communication bandwidth part (BWP) used by user equipment during sidelink communication transmitting and receiving is defined. In order to guarantee data transmitting and receiving between the same arbitrary users, the same BWP is used for transmitting and receiving data, each user of the vehicle-to-everything (V2x) may only be configured with one BWP for sidelink communication, and it is assumed that all user devices of the V2x are configured with the same BWP.

A V2x system includes vehicle-to-pedestrian (V2P), where a pedestrian may be a joint name of slow and vulnerable road participants, including a pedestrian, a bicycle, a scooter, etc., collectively referred to as P users, whose communication devices include a handheld device. These devices use portable lithium batteries, which are relatively sensitive to device energy consumption. In addition, the size and cost limits of the handheld device are also high, so it is necessary to consider power saving and complexity of these terminals.

Vehicle-to-everything (V2x) vehicle-mounted devices are generally equipped with a wider BWP since they need to meet high requirements on communication data throughput between vehicles. Each device needs to perform blind detection of sidelink control information (SCI) sent by the other devices in a resource pool of the BWP, also needs to receive information such as resource occupation contained in the SCI sent by the other devices, and measures sidelink control or data transmission of the other devices, so as to avoid possible transmission collision. These operations result in high processing complexity and energy consumption of user equipment.

In the example of the present disclosure, in order to solve the above problems, in the V2x sidelink communication system, a sidelink device may be configured with different sidelink communication BWP according to different device types.

Sidelink devices with energy-saving requirements, such as a handheld terminal device, are uniformly configured with a BWP with a bandwidth narrower than that of other vehicle-mounted devices without energy-saving requirements.

It is assumed that the BWP configured for the handheld device requiring energy saving is BWP1, and the BWP configured for an ordinary vehicle-mounted device is BWP2. For example, as shown in FIG. 1, the BWP1 and the BWP2 may have the same subcarrier spacing, frequency domain resources occupied by the BWP1 are a subset of frequency domain resources occupied by the BWP2, and a resource cluster in a sidelink communication resource pool configured on the BWP1 are a subset of a resource cluster in a sidelink communication resource pool configured on the BWP2.

The resource cluster is the smallest unit of frequency domain resource allocation during sidelink data transmission, and a relationship among the BWP, the resource pool, and the resource cluster is shown in FIG. 2, for example.

When a sidelink device configured with the BWP2 needs to transmit data to a sidelink device configured with the BWP1, a frequency resource for transmission should belong to the resource pool configured on the BWP1, such that the sidelink device configured with the BWP1 may also receive data sent by the sidelink device configured with the BWP2.

In the example of the present disclosure, a resource pool for transmitting sidelink communication information to a sidelink device that uses the BWP1 may be configured on the BWP2, which limits resource selection of the sidelink device configured with the BWP2. That is to say, when needing to transmit sidelink data to the sidelink device configured with the BWP1, the sidelink device configured with the BWP2 needs to select a time frequency resource corresponding to the BWP1 resource pool for transmission.

Based on the above configuration, the example of the present disclosure provides a method for determining a frequency domain resource, which will be introduced from the side of a first type of sidelink device first.

With reference to FIG. 3, FIG. 3 is a flowchart of a method for determining a frequency domain resource according to an example. The method may be applied to the first type of sidelink device. In one example, the first type of sidelink device may be a device with low energy consumption requirements, such as a vehicle-mounted device, and the method may include:

In step 101, a target device type of a receiving device for sidelink communication is determined.

In this step, the sidelink device may determine the target device type of the receiving device by interacting with the receiving device.

For example, during sidelink communication with the receiving device, the receiving device transmits its own target device type to the sidelink device through a device discovery signal or a paging signal, and the sidelink device may directly determine the target device type of the receiving device.

In step 102, a target frequency domain resource used for sidelink communication with the receiving device is determined according to the target device type.

In this step, the sidelink device determines the target frequency domain resource used for sidelink communication with the receiving device according to different target device types.

In the example above, the first type of sidelink device may determine the target frequency domain resource used for sidelink communication with the receiving device according to the target device type of the receiving device for sidelink communication. In such way, even if different types of sidelink devices are configured with different frequency domain resources, sidelink communication between the first type of sidelink device and the receiving device may still be guaranteed.

In an example, for step 102, in the case that it is determined that the target device type includes at least one second type of sidelink device, the sidelink device may determine the target frequency domain resource used for sidelink communication with the second type of sidelink device.

In this example of the present disclosure, the second type of sidelink device may be the first type of sidelink device in an energy-saving state, that is, a certain sidelink device may be switched between two states, and belongs to the first type of sidelink device if not in an energy-saving state, and belongs to the second type of sidelink device if in an energy-saving state. For example, the vehicle-mounted device belongs to the first type of sidelink device when plugged in, and belongs to the second type of sidelink device when not plugged in.

Alternatively, the second type of sidelink device may be a sidelink device that has a different device type from the first type of sidelink device and that has high energy consumption requirements. For example, the first type of sidelink device is a plugged-in vehicle-mounted device, and the second type of sidelink device is an unplugged handheld device.

In the example above, in the case that it is determined that the target device type includes at least one second type of sidelink device, the first type of sidelink device may determine the target frequency domain resource used for sidelink communication with the second type of sidelink device according to the target device type. The second type of sidelink device may be the first type of sidelink device in an energy-saving state, or the second type of sidelink device may be a sidelink device having a different device type from the first type of sidelink device. Higher usability is achieved.

In an example, any one of the following manners may be used to determine that the target device type includes the second type of sidelink device:

In a first manner, a device identifier and/or a destination address of the receiving device is used as a basis.

It may be determined that the target device type includes the second type of sidelink device in the case that the first type of sidelink device determines that the device identifier of the receiving device is a predefined device identifier of the second type of sidelink device.

If the first type of sidelink device determines that the destination address of the receiving device is a predefined destination address of the second type of sidelink device, for example, it is predefined that the destination address of the second type of sidelink device belongs to a certain IP address field, and if the first type of sidelink device determines that the destination address of the receiving device belongs to the predefined IP address field, it may be determined that the target device type includes the second type of sidelink device.

In a second manner, an indication of higher-layer signaling is used as a basis.

In the example of the present disclosure, the higher-layer signaling may be application layer signaling, the first type of sidelink device may receive signaling sent by a higher layer to a media access control address (MAC) layer or a physical layer, and if the signaling indicates that the receiving device includes the second type of sidelink device, the first type of sidelink device may determine that the target device type includes the second type of sidelink device.

In a third manner, control information sent by the receiving device is used as a basis.

In the example of the present disclosure, the receiving device transmits the control information to the first type of sidelink device during the sidelink device establishes unicast or multicast communication with the receiving device, and the control information indicates that the receiving device is a second type of sidelink device, so the first type of sidelink device may determine that the target device type includes the second type of sidelink device.

For example, the control information carries information on BWP used by the receiving device, the BWP being allocated to the second type of sidelink device. In this case, the first type of sidelink device may determine that the target device type includes the second type of sidelink device.

In the example above, the first type of sidelink device may determine whether the target device type includes the second type of sidelink device according to any one of the device identifier and/or the destination address of the receiving device, or the higher-layer signaling, or the control information sent by the receiving device, which is simple and convenient to achieve and high in usability.

In an example, with reference to FIG. 4, FIG. 4 is a flowchart of another method for determining a frequency domain resource according to the example shown in FIG. 3, and step 102 includes:

in step 102-1, a first frequency domain resource range used by the first type of sidelink device for sidelink communication with the second type of sidelink device is determined.

The first type of sidelink device may determine the first frequency domain resource range for sidelink communication with the second type of sidelink device in a self-used sidelink communication resource pool, and then use the frequency domain resources within the first frequency domain resource range for subsequent sidelink communication with the second type of sidelink device.

In step 102-2, the target frequency domain resource is determined within the first frequency domain resource range.

In this step, the first type of sidelink device determines the target frequency domain resources for sidelink communication within the first frequency domain resource range, and then transmits and/or receives sidelink data through the target frequency domain resource.

In the example above, the first type of sidelink device may first determine the first frequency domain resource range used by itself for sidelink communication with the second type of sidelink device, further determine the target frequency domain resource within the first frequency domain resource range, and achieve sidelink communication between the first type of sidelink device and the second type of sidelink device in the case that the first type of sidelink device and the second type of sidelink device are configured with different frequency domain resources, which is simple and convenient to achieve and high in usability.

In an example, any one of the following manners may be used to determine the first frequency domain resource range:

In a first manner, a preconfigured frequency domain resource range is taken as the first frequency domain resource range.

The first type of sidelink device may directly take a preconfigured frequency domain resource range in a protocol as the first frequency domain resource range in the sidelink communication resource pool corresponding to the first type of sidelink device.

Through the above process, the first type of sidelink device may quickly determine the first frequency domain resource range according to preconfiguration, and high usability is achieved.

In a second manner, the first frequency domain resource range is determined according to an indication of a base station.

As shown in FIG. 5, FIG. 5 is a flowchart of another method for determining a frequency domain resource according to the example shown in FIG. 4, and step 102-1 may include: In step 102-11, downlink control signaling sent by the base station is received.

In step 102-12, a frequency domain resource range indicated by the downlink control signaling is taken as the first frequency domain resource range.

In this step, the first type of sidelink device may take the frequency domain resource range indicated by the downlink control signaling sent by the base station as the first frequency domain resource range.

In the example above, the first type of sidelink device may quickly determine the first frequency domain resource range according to indication of the base station, and high usability is achieved.

In a third manner, a frequency domain resource overlapping with a frequency domain resource of a bandwidth part (BWP) used by the second type of sidelink device is taken as the first frequency domain resource range.

For example, as shown in FIG. 6, the base station preconfigures the second type of sidelink device with the frequency domain resource of the BWP used by the second type of sidelink device, or the frequency domain resource of the BWP used by the second type of sidelink device is pre-configured in the protocol, and the first type of sidelink device directly takes the frequency domain resource overlapping with the frequency domain resource of the BWP used by the second type of sidelink device as the first frequency domain resource range.

In the example above, the first type of sidelink device may also take the frequency domain resource overlapping with the frequency domain resource of the BWP used by the second type of sidelink device as the first frequency domain resource range, and may also quickly determine the first frequency domain resource range, and high usability is achieved.

In this example, the second type of sidelink device may be the first type of sidelink device in an energy-saving state, and in this case, the second type of sidelink device may not be separately configured with a corresponding sidelink communication resource pool. A method for determining a frequency domain resource provided by the example of the present disclosure will be introduced from the side of the second type of sidelink device, where the second type of sidelink device is the first type of sidelink device in the energy-saving state.

With reference to FIG. 7, FIG. 7 is a flowchart of another method for determining a frequency domain resource according to an example. The method may be applied to a second type of sidelink device. The second type of sidelink device may be a first type of sidelink device in an energy-saving state, and the method may include:

In step 201, a target resource cluster set is determined within a sidelink communication resource pool used by a first type of sidelink device.

The target resource cluster set is located in a frequency domain resource range of a bandwidth part (BWP) used by the second type of sidelink device.

For example, as shown in FIG. 8, in the sidelink communication resource pool used by the first type of sidelink device, the second type of sidelink device determines the target resource cluster set within the frequency resource range of the BWP of the second type of sidelink device, and the target resource cluster set corresponds to a resource cluster circled by a black box in FIG. 8.

In step 202, the target resource cluster set is taken as a sidelink communication resource pool of the second type of sidelink device.

In this step, the second type of sidelink device may directly take the resource cluster set determined in step 201 as the sidelink communication resource pool of the second type of sidelink device, as shown in FIG. 8.

In the example above, if the second type of sidelink device is the first type of sidelink device in an energy-saving state, it is unnecessary to separately allocate a new sidelink communication resource pool to the second type of sidelink device, and the second type of sidelink device may determine its own sidelink communication resource pool within the sidelink communication resource pool used by the first type of sidelink device.

Corresponding to the aforementioned example of the method for implementing an application function, the present disclosure further provides examples of an apparatus for implementing an application function and a corresponding sidelink device.

Figure 9:
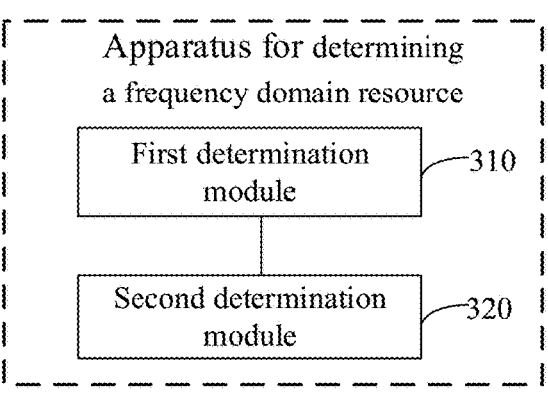
FIG. 9 is a block diagram of an apparatus for determining a frequency domain resource according to an example.

With reference to FIG. 9, FIG. 9 is a block diagram of an apparatus for determining a frequency domain resource according to an example, and the apparatus is applied to a first type of sidelink device, and includes:

a first determination module 310 configured to determine a target device type of a receiving device for sidelink communication; and a second determination module 320 configured to determine a target frequency domain resource used for sidelink communication with the receiving device according to the target device type.

In one example, the second determination module 320 is configured to determine, on the condition that the target device type includes at least one second type of sidelink device, a target frequency domain resource used for sidelink communication with the second type of sidelink device.

The second type of sidelink device is the first type of sidelink device in an energy-saving state, or the second type of sidelink device is a sidelink device having a different device type from the first type of sidelink device and having high energy consumption requirements.

Figure 10:
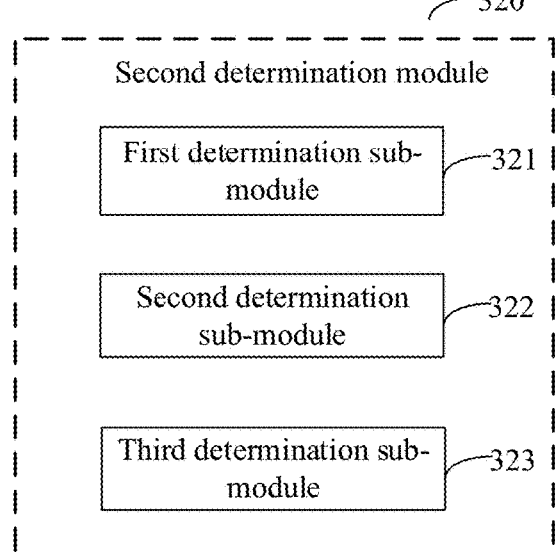
FIG. 10 is a block diagram of another apparatus for determining a frequency domain resource according to an example.

With reference to FIG. 10, FIG. 10 is a block diagram of another apparatus for determining a frequency domain resource on the basis of the example shown in FIG. 9, and the second determination module 320 includes:

a first determination sub-module 321 configured to determine that the target device type includes the second type of sidelink device, in the case that it is determined that a device identifier of the receiving device is a predefined device identifier of the second type of sidelink device and/or a destination address of the receiving device is a predefined destination address of the second type of sidelink device; or a second determination sub-module 322 configured to receive higher-layer signaling of the first type of sidelink device, where the higher-layer signaling indicates that the receiving device includes the second type of sidelink device, and to determine that the target device type includes the second type of sidelink device; or a third determination sub-module 323 configured to receive control information sent by the receiving device, where the control information indicates that the device type of the receiving device is the second type of sidelink device, and to determine that the target device type includes the second type of sidelink device.

Figure 11:
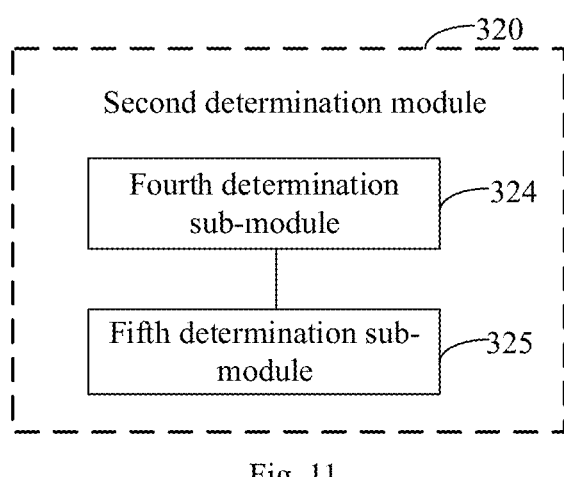
FIG. 11 is a block diagram of another apparatus for determining a frequency domain resource according to an example.

With reference to FIG. 11, FIG. 11 is a block diagram of another apparatus for determining a frequency domain resource on the basis of the example shown in FIG. 9, and the second determination module 320 includes:

a fourth determination sub-module 324 configured to determine a first frequency domain resource range used by the first type of sidelink device for sidelink communication with the second type of sidelink device; and a fifth determination sub-module 325 configured to determine the target frequency domain resource within the first frequency domain resource range.

Figure 12:
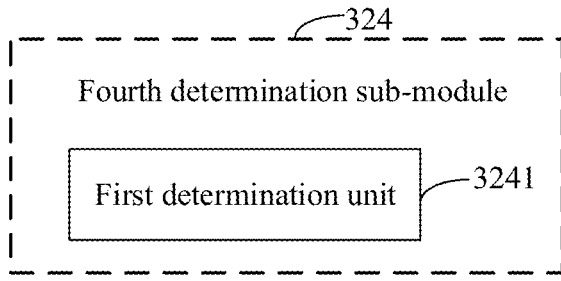
FIG. 12 is a block diagram of another apparatus for determining a frequency domain resource according to an example.

With reference to FIG. 12, FIG. 12 is a block diagram of another apparatus for determining a frequency domain resource on the basis of the example shown in FIG. 11, and the fourth determination sub-module 324 includes:

a first determination unit 3241 configured to take a preconfigured frequency domain resource range as the first frequency domain resource range.

Figure 13:
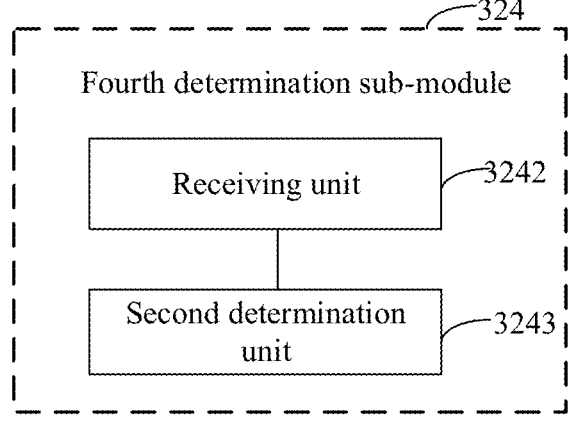
FIG. 13 is a block diagram of another apparatus for determining a frequency domain resource according to an example.

With reference to FIG. 13, FIG. 13 is a block diagram of another apparatus for determining a frequency domain resource on the basis of the example shown in FIG. 11, and the fourth determination sub-module 324 includes:

a receiving unit 3242 configured to receive downlink control signaling sent by the base station; and a second determination unit 3243 configured to take a frequency domain resource range indicated by the downlink control signaling as the first frequency domain resource range.

Figure 14:
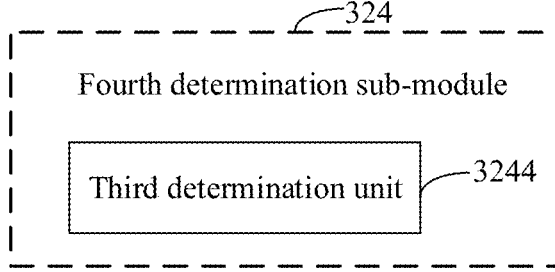
FIG. 14 is a block diagram of another apparatus for determining a frequency domain resource according to an example.

With reference to FIG. 14, FIG. 14 is a block diagram of another apparatus for determining a frequency domain resource on the basis of the example shown in FIG. 11, and the fourth determination sub-module 324 includes:

a third determination unit 3244 configured to take a frequency domain resource overlapping with a frequency domain resource of a bandwidth part (BWP) used by the second type of sidelink device as the first frequency domain resource range.

Figure 15:
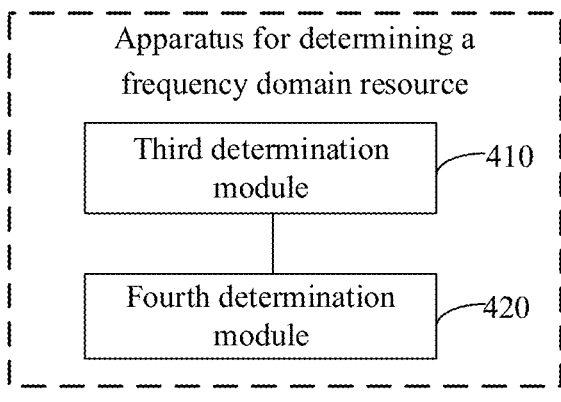
FIG. 15 is a block diagram of another apparatus for determining a frequency domain resource according to an example.

With reference to FIG. 15, FIG. 15 is a block diagram of a sidelink device according to an example, and the apparatus is applied to a second type of sidelink device, and includes:

a third determination module 410 configured to determine a target resource cluster set within a sidelink communication resource pool used by a first type of sidelink device, where the target resource cluster set is located in a frequency domain resource range of a bandwidth part (BWP) used by the second type of sidelink device; and a fourth determination module 420 configured to take the target resource cluster set as a sidelink communication resource pool of the second type of sidelink device;

where the second type of sidelink device is the first type of sidelink device in an energy-saving state.

As for the apparatus example, since this example basically corresponds to the method example, partial description of the method example may be referred to for relevant contents. The apparatus example described above is merely exemplary, units described as separated parts may or may not be physically separated, and parts displayed as units may or may not be physical units, that is, they may be located in one place or distributed on multiple network units. Some or all modules may be selected according to actual needs to achieve the objective of a solution of the present disclosure. Those skilled in the art may understand and implement the present disclosure without creative labor.

Correspondingly, the present disclosure further provides a computer-readable storage medium storing a computer program. The computer program is used for executing any one of the methods for determining a frequency domain resource on the side of the first type of sidelink device.

Correspondingly, the present disclosure further provides a computer-readable storage medium storing a computer program. The computer program is used for executing the method for determining a frequency domain resource on the side of the second type of sidelink device.

Correspondingly, the present disclosure further provides an apparatus for determining a frequency domain resource, where the apparatus is applied to a first type of sidelink device, and includes:

a processor, and a memory configured to store an executable instruction executed by the processor;

where the processor is configured to:

determine a target device type of a receiving device for sidelink communication; and determine a target frequency domain resource used for sidelink communication with the receiving device according to the target device type.

Figure 16:
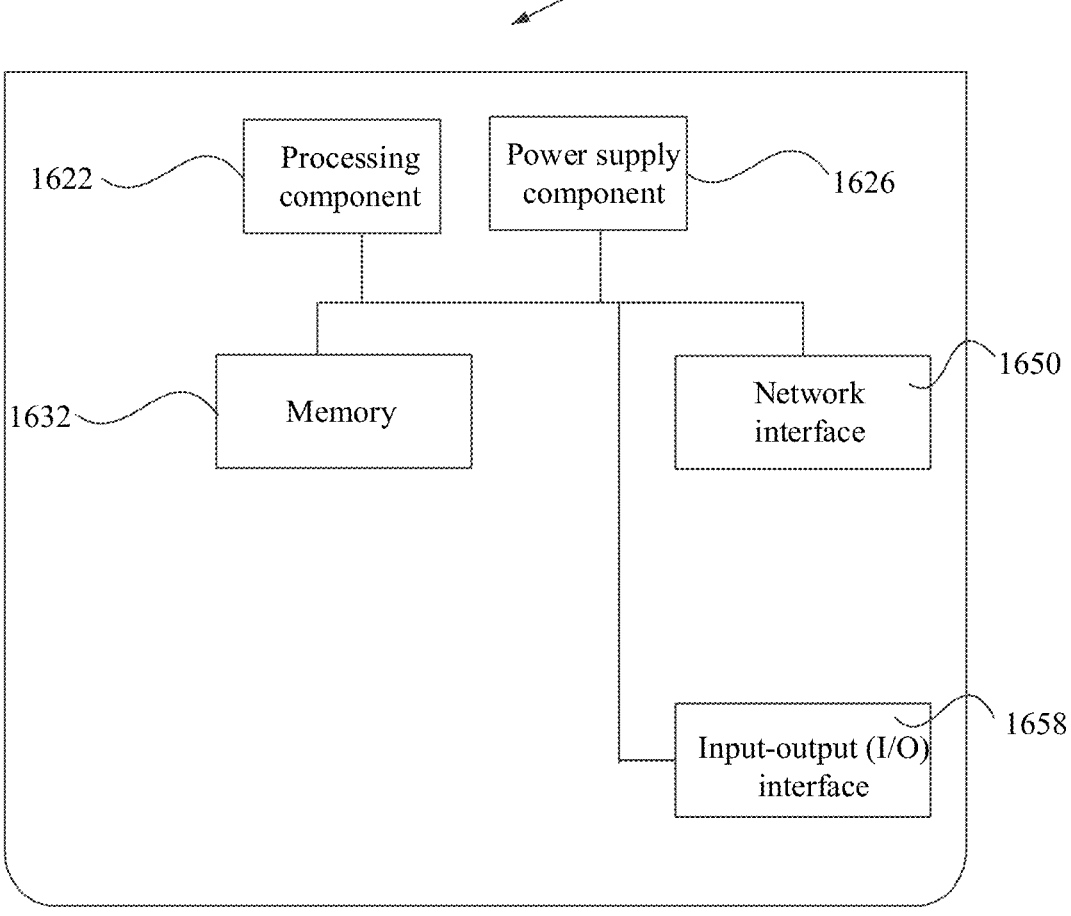
FIG. 16 is a structural schematic diagram of an apparatus for determining a frequency domain resource according to an example of the present disclosure.

As shown in FIG. 16, FIG. 16 is a structural schematic diagram of an apparatus 1600 for determining a frequency domain resource according to an example. For example, the apparatus 1600 may be provided as a first type of sidelink device. With reference to FIG. 16, the apparatus 1600 includes a processing component 1622 and a memory resource represented by a memory 1632, the processing component 1622 further includes one or more processors, and the memory resource is configured to store instructions, such as application programs, that may be executed by the processing component 1622. The application program stored in the memory 1632 may include one or more modules each corresponding to a set of instructions. In addition, the processing component 1622 is configured to execute instructions to execute the method for determining a frequency domain resource above.

The apparatus 1600 may further include a power supply component 1626 configured to execute power management of the apparatus 1600, a wired or wireless network interface 1650 configured to connect the apparatus 1600 to a network, and an input-output (I/O) interface 1658. The apparatus 1600 may operate an operating system stored in the memory 1632, such as Android, an iPhone operating system (IOS), Windows Server™, Mac OS X™, UNIX™, Linux™, Free-BSD™, or the like.

When the instructions in the memory 1632 are executed by the processing component 1622, the apparatus 1600 is enabled to execute the method for determining a frequency domain resource above.

Correspondingly, the present disclosure further provides an apparatus for determining a frequency domain resource, where the apparatus is applied to a second type of sidelink device, and includes:

a processor, and a memory configured to store an executable instruction executed by the processor;

where the processor is configured to:

determine a target resource cluster set within a sidelink communication resource pool used by a first type of sidelink device, where the target resource cluster set is located in a frequency domain resource range of a bandwidth part (BWP) used by the second type of sidelink device; and take the target resource cluster set as a sidelink communication resource pool of the second type of sidelink device;

where the second type of sidelink device is the first type of sidelink device in an energy-saving state.

Figure 17:
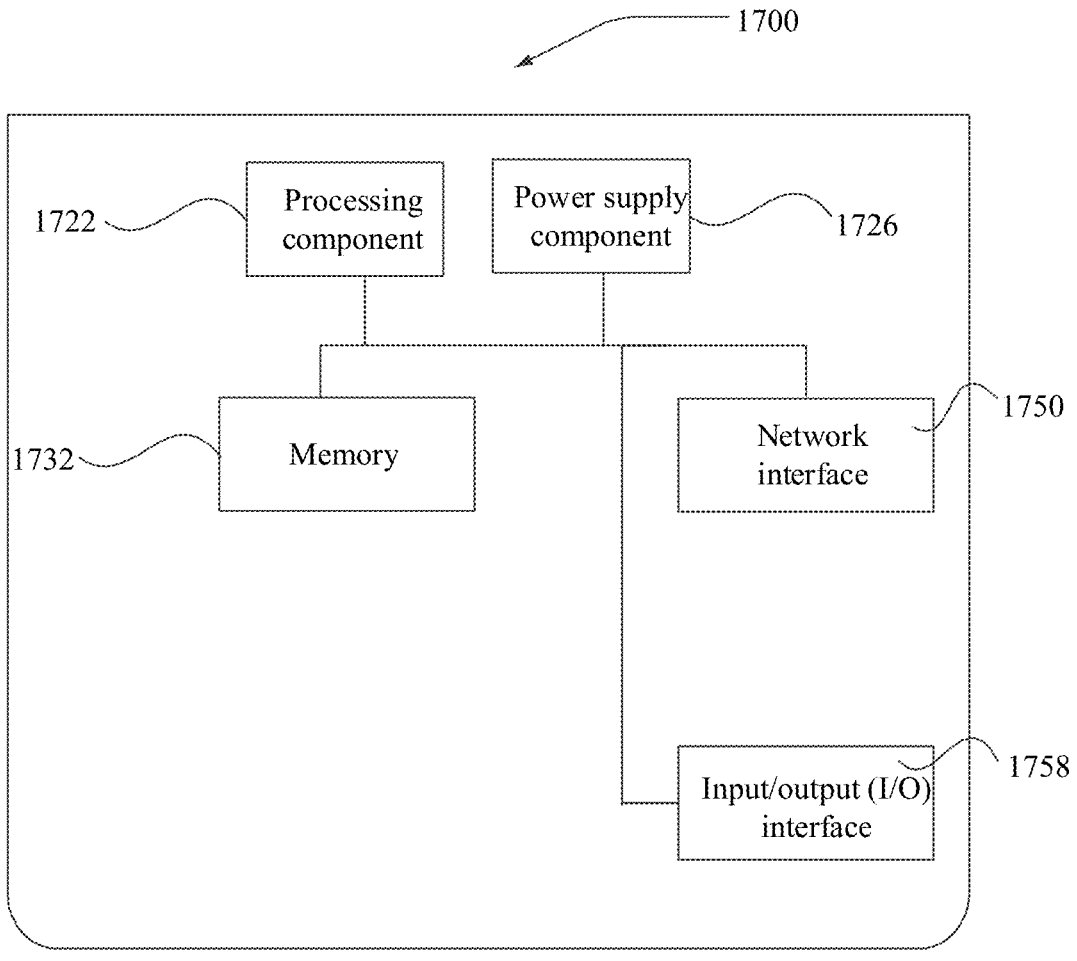
FIG. 17 is a structural schematic diagram of another apparatus for determining a frequency domain resource according to an example of the present disclosure.

As shown in FIG. 17, FIG. 17 is a structural schematic diagram of an apparatus 1700 for determining a frequency domain resource according to an example. For example, the apparatus 1700 may be provided as a second type of sidelink device, where the second type of sidelink device is a first type of sidelink device in an energy-saving state. With reference to FIG. 17, the apparatus 1700 includes a processing component 1722 and a memory resource represented by a memory 1732. The processing component 1722 further includes one or more processors. The memory resource is configured to store instructions, such as application programs, that may be executed by the processing component 1722. The application program stored in the memory 1732 may include one or more modules each corresponding to a set of instructions. In addition, the processing component 1722 is configured to execute instructions to execute the method for determining a frequency domain resource above.

The apparatus 1700 may further include a power supply component 1726 configured to execute power management of the apparatus 1700, a wired or wireless network interface 1750 configured to connect the apparatus 1700 to a network, and an input-output (I/O) interface 1758. The apparatus 1700 may operate an operating system stored in the memory 1732, such as Android, an iPhone operating system (IOS), Windows Server™, Mac OS X™, UNIX™, Linux™, Free-BSD™, or the like.

When the instructions in the memory 1732 are executed by the processing component 1722, the apparatus 1700 is enabled to execute the method for determining a frequency domain resource above.

A technical solution provided by the example of the present disclosure may achieve the following beneficial effects:

In the example of the present disclosure, the first type of sidelink device may determine the target frequency domain resource used for sidelink communication with the receiving device according to the target device type of the receiving device for sidelink communication. Even if different types of sidelink devices are configured with different frequency domain resources, sidelink communication between the first type of sidelink device and the receiving device may still be guaranteed.

In the example of the present disclosure, in the case that it is determined that the target device type includes at least one second type of sidelink device, the first type of sidelink device may determine the target frequency domain resource used for sidelink communication with the second type of sidelink device according to the target device type. The second type of sidelink device may be the first type of sidelink device in an energy-saving state, or the second type of sidelink device may be a sidelink device having a different device type from the first type of sidelink device. Higher usability is achieved.

In the example of the present disclosure, the first type of sidelink device may determine whether the target device type includes the second type of sidelink device according to any one of the device identifier and/or the destination address of the receiving device, or the higher-layer signaling, or the control information sent by the receiving device, which is simple and convenient to achieve and has high usability.

In the example of the present disclosure, the first type of sidelink device may first determine the first frequency domain resource range used by itself for sidelink communication with the second type of sidelink device, further determine the target frequency domain resource within the first frequency domain resource range, achieving sidelink communication between the first type of sidelink device and the second type of sidelink device in the case that the first type of sidelink device and the second type of sidelink device are configured with different frequency domain resources, which is simple and convenient to achieve and has high usability.

In the example of the present disclosure, the first type of sidelink device may take the preconfigured frequency domain resource range in a protocol as the first frequency domain resource range, and through the above process, the first type of sidelink device may quickly determine the first frequency domain resource range according to preconfiguration, and high usability is achieved.

In the example of the present disclosure, the first type of sidelink device may take the frequency domain resource range indicated by the downlink control signaling sent by the base station as the first frequency domain resource range, so the first type of sidelink device may quickly determine the first frequency domain resource range according to indication of the base station, and high usability is achieved.

In the example of the present disclosure, the first type of sidelink device may also take the frequency domain resource overlapping with the frequency domain resource of the BWP used by the second type of sidelink device as the first frequency domain resource range, and may also quickly determine the first frequency domain resource range, and high usability is achieved.

In the example of the present disclosure, in the case that the second type of sidelink device is the first type of sidelink device in an energy-saving state, the second type of sidelink device may not be separately configured with a sidelink communication resource pool, the target resource cluster set may be directly determined in the sidelink communication resource pool used by the first type of sidelink device, where the target resource cluster set is located in the frequency domain resource range of the BWP used by the second type of sidelink device. The second type of sidelink device takes the target resource cluster set as the sidelink communication resource pool of the second type of sidelink device, which effectively saves energy consumption of the sidelink device, reduces complexity of the device, and achieves higher usability.

Those skilled in the art will easily conceive of other examples of the present disclosure after considering the specification and implementing the invention disclosed herein. The present disclosure is intended to cover any modification, use, or adaptive change of the present disclosure, which follows general principles of the present disclosure and includes common knowledge or conventional technical means in the technical field not disclosed in the present disclosure. The specifications and the examples are merely deemed to be exemplary, and the true scope and spirit of the present disclosure are indicated by the following claims.

It should be understood that the present disclosure is not limited to precise structures described above and shown in the accompanying drawings, and various modifications and changes can be made without departing from the scope of the present disclosure. The scope of the present disclosure is limited only by the appended claims.

What is claimed is:

1. A method for determining a frequency domain resource, comprising:

determining, by a first type of sidelink device, a target device type of a receiving device for sidelink communication:

determining, by the first type of sidelink device, a target frequency domain resource for sidelink communication with the receiving device according to the target device type, wherein the target frequency domain resource for the sidelink communication with the receiving device is a subset of sidelink communication frequency domain resources used by the first type of sidelink device;

wherein the method further comprises:

determining, based on a determination that the target device type comprises a second type of sidelink device, a target frequency domain resource for sidelink communication with the second type of sidelink device, wherein the second type of sidelink device is the first type of sidelink device in an energy-saving state, or the second type of sidelink device is a sidelink device having a different device type from the first type of sidelink device and having high energy consumption requirements;

wherein the method further comprises:

determining a first frequency domain resource range adopted by the first type of sidelink device for the sidelink communication with the second type of sidelink device; and determining the target frequency domain resource within the first frequency domain resource range;

wherein the method further comprises:

taking a frequency domain resource overlapping with a frequency domain resource of a bandwidth part (BWP) adopted by the second type of sidelink device as the first frequency domain resource range.

2. The method according to claim 1, wherein determining that the target device type comprises the second type of sidelink device comprises:

determining that the target device type comprises the second type of sidelink device based on a determination that a device identifier of the receiving device is a predefined device identifier of the second type of sidelink device or a destination address of the receiving device is a predefined destination address of the second type of sidelink device; or receiving higher-layer signaling for the first type of sidelink device, wherein the higher-layer signaling indicates that the receiving device comprises the second type of sidelink device; and determining that the target device type comprises the second type of sidelink device; or receiving control information sent by the receiving device, wherein the control information indicates that a device type of the receiving device is the second type of sidelink device; and determining that the target device type comprises the second type of sidelink device.

3. The method according to claim 1, further comprising:

taking a preconfigured frequency domain resource range as the first frequency domain resource range.

4. The method according to claim 1, further comprising:

receiving a downlink control signaling sent by a base station; and taking a frequency domain resource range indicated by the downlink control signaling as the first frequency domain resource range.

5. A method for determining a frequency domain resource, comprising:

determining, by a second type of sidelink device, a target resource cluster set within a sidelink communication resource pool adopted by a first type of sidelink device, wherein the target resource cluster set is located in a frequency domain resource range of a bandwidth part (BWP) adopted by the second type of sidelink device; and taking, by the second type of sidelink device, the target resource cluster set as a sidelink communication resource pool of the second type of sidelink device; and informing the first type of sidelink device of a target device type of the second type of sidelink device, wherein the target device type is used by the first type of sidelink device to determine a target frequency domain resource for sidelink communication with the second type of sidelink device, and the target frequency domain resource for the sidelink communication with the second type of sidelink device is a subset of sidelink communication frequency domain resources used by the first type of sidelink device:

wherein the second type of sidelink device is the first type of sidelink device in an energy-saving state, or the second type of sidelink device is a sidelink device having a different device type from the first type of sidelink device and having high energy consumption requirements, wherein the target frequency domain resource for sidelink communication with the second type of sidelink device is determined based on a determination that the target device type comprises the second type of sidelink device, wherein a first frequency domain resource range adopted by the first type of sidelink device for the sidelink communication with the second type of sidelink device is determined, and the target frequency domain resource is determined among the first frequency domain resource range, and wherein a frequency domain resource overlapping with a frequency domain resource of a bandwidth part (BWP) adopted by the second type of sidelink device is taken as the first frequency domain resource range.

6. A non-transitory computer-readable storage medium storing a computer program, wherein the computer program, when collectively executed by one or more processors of a first type of sidelink device, causes the first type of sidelink device to perform the method for determining a frequency domain resource according to claim 1.

7. A non-transitory computer-readable storage medium storing a computer program, wherein the computer program, when collectively executed by one or more processors of a second type of sidelink device, causes the second type of sidelink device to perform the method for determining a frequency domain resource according to claim 5.

8. A device for determining a frequency domain resource, comprising:

one or more processors, and a memory configured to store processor-executable instructions:

wherein the processor-executable instructions, when collectively executed by the one or more processors, cause the device for determining the frequency domain resource to act as a first type of sidelink device and to:

determine a target device type of a receiving device for sidelink communication; and determine a target frequency domain resource for sidelink communication with the receiving device according to the target device type, wherein the target frequency domain resource for the sidelink communication with the receiving device is a subset of sidelink communication frequency domain resources used by the first type of sidelink device, wherein the one or more processors are further collectively configured to:

determine, based on a determination that the target device type comprises a second type of sidelink device, a target frequency domain resource for sidelink communication with the second type of sidelink device;

wherein the second type of sidelink device is the first type of sidelink device in an energy-saving state, or the second type of sidelink device is a sidelink device having a different device type from the first type of sidelink device and having high energy consumption requirements:

wherein the one or more processors are further collectively configured to:

determine a first frequency domain resource range adopted by the first type of sidelink device for the sidelink communication with the second type of sidelink device; and determine the target frequency domain resource within the first frequency domain resource range;

wherein the one or more processors are further collectively configured to:

take a frequency domain resource overlapping with a frequency domain resource of a bandwidth part (BWP) adopted by the second type of sidelink device as the first frequency domain resource range.

9. The device according to claim 8, wherein the one or more processors are further collectively configured to:

determine that the target device type comprises the second type of sidelink device based on a determination that a device identifier of the receiving device is a predefined device identifier of the second type of sidelink device or a destination address of the receiving device is a predefined destination address of the second type of sidelink device; or receive higher-layer signaling for the first type of sidelink device, wherein the higher-layer signaling indicates that the receiving device comprises the second type of sidelink device; and determine that the target device type comprises the second type of sidelink device; or receive control information sent by the receiving device, wherein the control information indicates that a device type of the receiving device is the second type of sidelink device; and determine that the target device type comprises the second type of sidelink device.

10. The device according to claim 8, wherein the one or more processors are further collectively configured to:

take a preconfigured frequency domain resource range as the first frequency domain resource range.

11. The device according to claim 8, wherein the one or more processors are further collectively configured to:

receive a downlink control signaling sent by a base station; and take a frequency domain resource range indicated by the downlink control signaling as the first frequency domain resource range.

12. A device for determining a frequency domain resource, comprising:

one or more processors, and a memory configured to store processor-executable instruction:

wherein the processor-executable instructions, when collectively executed by the one or more processor, cause the device for determining the frequency domain resource to act as a second type of sidelink device and to perform the method for determining a frequency domain resource according to claim 5.

\* \* \* \* \*